United States Patent [19]

Lawrence

[11] 4,138,145

[45] Feb. 6, 1979

[54] PIPE COUPLINGS

[75] Inventor: Anthony J. Lawrence, Tewkesbury, England

[73] Assignee: The Tungum Company Limited, Cheltenham, United Kingdom

[21] Appl. No.: 727,606

[22] Filed: Sep. 28, 1976

[30] Foreign Application Priority Data

Oct. 2, 1975 [GB] United Kingdom ............... 40255/75

[51] Int. Cl.² ............................................. F16L 55/00
[52] U.S. Cl. ..................................... 285/23; 285/323; 285/343
[58] Field of Search ................. 285/23, 342, 343, 329, 285/322, 323, 348, 379, 341, 347, 349, DIG. 11, 380, 108; 277/112, 180, 9.5, 186, 235; 403/12; 151/7; 85/8.8

[56] References Cited

U.S. PATENT DOCUMENTS

| | | | |
|---|---|---|---|
| 1,157,574 | 10/1915 | Mueller | 284/DIG. 11 |
| 2,452,277 | 10/1948 | Woodling | 285/348 X |
| 3,214,200 | 10/1965 | Carlson et al. | 285/323 |
| 3,259,404 | 7/1966 | Papenguth | 277/180 X |
| 3,563,575 | 2/1971 | Sanford | 285/343 |
| 3,679,239 | 7/1972 | Schmitt | 285/348 |
| 3,986,730 | 10/1976 | Martelli | 285/23 |

FOREIGN PATENT DOCUMENTS 1072872  6/1967  United Kingdom ..................... 285/323

*Primary Examiner*—Dave W. Arola
*Attorney, Agent, or Firm*—Young & Thompson

[57] ABSTRACT

A pipe coupling including cooperating male and female threaded elements and the female threaded element has a recess containing a pipe-gripping collar which has cause to contract radially on to the pipe upon tightening of the male element relative to the female element.

In order to facilitate storage and transport of the coupling components, a washer is provided which is resiliently engageable with the thread of the female element and serves to retain the pipe-gripping collar within the recess of the female element. This washer is preferably a metallic thrust washer which has a peripheral rubber flange which provides the resilient engagement with the thread of the female element.

1 Claim, 2 Drawing Figures

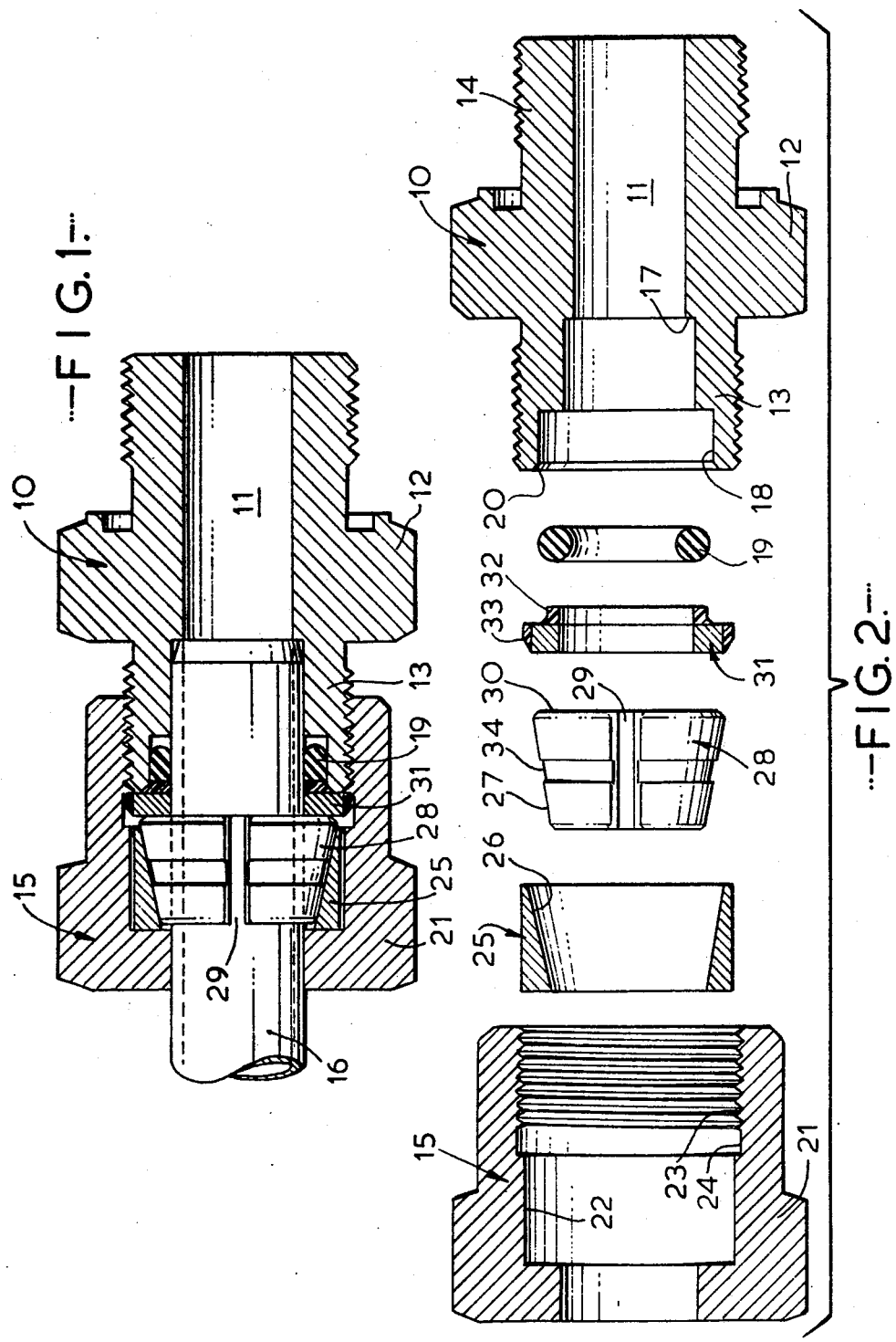

PIPE COUPLINGS

This invention relates to pipe couplings of the type comprising a body having a threaded portion, a sealing element which provides a seal between the pipe and the body, a pipe-gripping collar and a threaded member which has threaded engagement with the threaded portion of the body and, in use, serves to contract the collar radially on to the pipe due to the coaction of wedge surfaces provided respectively on the collar and within the threaded member, the wedge surface within the threaded member being formed either on the threaded member itself or on an annular element which fits within a recess in the threaded member and is freely rotatable relative thereto.

A coupling of the above type is hereinafter referred to as "a coupling of the type specified" and one disadvantage of such couplings at present in use is that, because of the use of a number of separate components, it is not possible to draw just two coupling members from store to make a coupling. There is also the possibility that, particularly when a joint is being made at a somewhat inaccessible position, one or more of the components may become dislodged during assembly of the coupling.

It is an object of the invention to provide an improved coupling of the type specified. More specifically, it is an object of the invention to provide means whereby the collar can be placed within the bore of the threaded member and held against inadvertent displacement.

According to a first aspect of the invention there is provided a coupling of the type specified including a washer resiliently engageable with the thread of the threaded member and effective to retain the pipe-gripping collar within the bore of the threaded member.

Said resilient engagement is preferably afforded by providing a peripheral flange on the washer, which flange is formed of synthetic rubber or a similar material, for example nitrile rubber, and is thermally bonded to a metal body of the washer.

In a preferred construction, a slip ring surrounds the pipe-gripping collar so that, in use, the slip ring and the collar are placed within the bore of the threaded member and then the washer is pressed down into resilient holding relationship with the thread of the threaded member. The washer desirably acts as a thrust washer and may have moulded on to it a backing ring which cooperates with the sealing element to prevent extrusion of the material of the sealing ring under high-pressure conditions.

According to a second aspect of the invention, there is provided a coupling member for a coupling of the type specified, said coupling member being in the form of a nut having a bore which is threaded for threaded engagement with a body of the coupling, said bore including an unthreaded portion in which a slip ring and a pipe-gripping collar are received and are located by means of a thrust washer which has a peripheral resilient projection which engages with the internal thread of said bore.

The invention will now be described by way of example with reference to the accompanying drawings, in which:

FIG. 1 is a sectional view of a coupling and,

FIG. 2 is an exploded sectional view illustrating the various components of the coupling.

The coupling includes a body 10 with a stepped throughbore 11 and a central portion 12 of external hexagonal shape on either side of which the body projects by way of externally threaded tubular extensions 13 and 14 which are aligned and coaxial with the throughbore 11. A coupling nut 15, which is threaded on the extension 13, can be tightened to grip a pipe 16 pushed into the bore 11 with respect to which it is a close sliding fit, and the hexagonal shape of the central body portion 12 enables the body 10 to be held against rotation by means of a spanner or the like as the nut 15 is tightened. A shoulder 17 at the junction between two portions of the stepped bore 11 of different diameters acts as a stop to limit the distance by which the pipe 16 can be inserted into the bore 11. The outer end of the extension 13 is counterbored to provide a recess 18 in which a resilient O-ring 19 is housed, the relative dimensions of the recess 18 and O-ring 19 being such that the O-ring 19 has a degree of axial freedom but is an interference fit radially with respect to the wall of the recess 18 and the outer surface of the pipe 16 to provide an effective seal against internal hydraulic pressure. The open mouth of the recess 18 is outwardly flared at 20 for a purpose to be described.

An enlarged head portion 21 is provided at the outer end of the nut 15 and the internal bore of the nut 15 includes a plain unthreaded portion 22 and a threaded portion 23 with the diameter of the unthreaded portion 22 substantially equal to the tooth-tip diameter of the threaded portion 23. An unthreaded bore portion 24 the diameter of which is substantially equal to the trough diameter of the portion 23 is disposed between portions 22 and 23. The plain unthreaded bore portion 22 contains a freely rotatable slip ring 25 having an internal wedge surface 26 with a taper of approximately 11° facing towards the body. The external diameter of the slip ring 25 is such that it will pass with clearance through the threaded bore portion 23 to bear against an internal shoulder at the end of bore portion 22.

Internal wedge surface 26 engages a complementary wedge surface 27 on an annular pipe-gripping collar 28 which surrounds the pipe 16. The collar 28 is longitudinally split as indicated at 29 throughout its length and has a flat end surface 30 which engages an annular metal thrust washer 31 of rectangular section which closely encircles the pipe 16 and abuts the end of the body extension 13. The thrust washer 31 thus serves to close the open end of the recess 18 in which the O-ring 19 is housed and prevents the adjacent split end of the collar 28 damaging the body 10 in the unlikely event of the collar 28 turning with the nut 15 as the latter is tightened.

The thrust washer 31 carries a backing ring 32 which is a close fit in the mouth of the recess 18 and is shaped as shown to conform to the outward flare 20 thereof. The backing ring 32 is of synthetic rubber and is thermally bonded to the metal thrust washer 31. It has a hardness greater than that of the O-ring 19 and serves to prevent extrusion of the material of the O-ring into the junction between the thrust washer 31 and the end of the extension 13. The shaping of the backing ring 32 for cooperation with the flare 20 at the mouth of the recess ensures that the backing ring 32 is accurately positioned relative to the body 10 in the assembled condition of the coupling.

A peripheral, resiliently deformable flange 33 is provided around the thrust washer 31, the flange 33 also being formed of natural or synthetic rubber and being thermally bonded to the metal body of the washer 31. In its relaxed state, the external diameter of the flange 33 is approximately equal to the trough diameter of threaded portion 23 of the bore of the coupling nut 15, i.e. it is a predetermined amount greater than the tooth-tip diameter of said threaded portion 23.

Thus, when the slip ring 25 and the pipe-gripping collar 28 are placed in the bore of the coupling nut 15 and the thrust washer 31 is then caused to enter said bore, the peripheral flange 33 is deformed as the washer 31 passes along the bore until the washer 31 reaches the intermediate bore portion 24 clear of the threads of the threaded portion 23. The thrust washer 31 will then act as a holding member to hold the collar 28 and slip ring 25 in position within the coupling nut 15 which can then be used as a pre-assembled coupling member capable of use, storage and transport as a one-piece structure. In like manner, the O-ring 19 is held resiliently within the recess 18 of the body 10 so that each of the members of the coupling can be provided in unitary form.

The slip ring 25 prevents contact between the nut 15 and the collar 28 and acts to prevent or reduce the transmission of torque from the nut 15 to the pipe-gripping collar 28. The wedge surface 27 of the collar 28 is relieved by means of an annular peripheral groove 34 disposed midway along the surface 27. This provides, in effect, two spaced lands which are disposed on respective sides of the groove 34 and provide the wedging engagement with the slip ring 25.

What we claim is:

1. A pipe coupling comprising a body having a threaded portion, a bore to receive a pipe and an enlargement of said bore, a sealing element disposed within said enlargement to provide a seal between the body and a pipe, a threaded member which is threaded for engagement with the threaded portion of the body, a pipe-gripping collar within a bore of said threaded member and arranged so that, upon rotation of said threaded member relative to the body, the collar is contracted radially to grip the pipe, said collar having an external wedge surface which coacts with an internal wedge surface of a slip ring located within the bore of the threaded member against an internal shoulder of said threaded member, and a washer having circumferentially continuous means bonded thereto resiliently engageable with the thread of the threaded member so as to retain the slip ring and the pipe-gripping collar within the bore of the threaded member, said washer having a rigid portion arranged so that, upon rotation of the threaded member relative to the body, the rigid portion engages the body for the transmission of thrust, axially of the pipe, between the body and the pipe-gripping collar and wherein said rigid portion of the washer carries a resilient backing ring bonded thereto which is arranged, in use, to enter said enlargement of the bore of the body to prevent extrusion of the material of the sealing element under pressure.

* * * * *